United States Patent [19]

Malecek

[11] 4,344,417
[45] Aug. 17, 1982

[54] SOLAR ENERGY COLLECTOR

[76] Inventor: Jan Malecek, 245 E. 77th St., New York, N.Y. 10021

[21] Appl. No.: 199,155

[22] Filed: Oct. 21, 1980

[51] Int. Cl.$^3$ ................................................ F24J 3/02
[52] U.S. Cl. ..................................... 126/439; 126/440
[58] Field of Search ............................... 126/438–441, 126/450; 350/258–262, 211

[56] References Cited

U.S. PATENT DOCUMENTS

| | | | |
|---|---|---|---|
| 3,957,029 | 5/1976 | Nozik | 126/441 |
| 4,074,704 | 2/1978 | Gellert | 126/440 |
| 4,078,547 | 3/1978 | Malecek | 126/439 |
| 4,282,862 | 8/1981 | Soleau | 126/439 |

FOREIGN PATENT DOCUMENTS 2827708  1/1979  Fed. Rep. of Germany ...... 126/439

*Primary Examiner*—James C. Yeung
*Attorney, Agent, or Firm*—Robert D. Farkas

[57] ABSTRACT

A solar energy collector utilizes a generally wedge-shaped device whose lateral upper surface is receptive of light rays passing therethrough into the wedge-shaped body of the collector. The lower surface of the collector reflects rays upwardly towards the upper surface. Such rays are re-reflected back towards the lowermost lower surface. Each successive internal reflection tends to further dispose the reflected rays in a direction substantially parallel to a plane located intermediate the upper and lower surfaces and substantially thereinbetween. A solar operated heater, disposed at the external face of the wedge-shaped collector is heated by all the rays directed towards such heater. The collector may be provided with a prismatic adapter located above the upper surface of the collector. The collector may be a solid glass structure, or a hollow structure, having a black body reflector therein that is parallel to the uppermost surface, or having the interior surfaces with a suitable "greenhouse effect" coating thereon, or having a liquid or gas disposed therein.

8 Claims, 6 Drawing Figures

SOLAR ENERGY COLLECTOR

BACKGROUND OF THE INVENTION

1. The Field of the Invention

This invention relates to solar energy collectors and more particularly to that class of apparatus which collects the rays of sun, disposing same to an area wherein a medium can be heated, such that the area is remotely located from the sun ray collecting device.

2. Description of the Prior Art

The prior art abounds with solar energy collectors, many of which collect the sun rays from various angles, concentrating same on a specific target area, usually disposed within the collection device. U.S. Pat. No. 3,182,654 issued May 11, 1965 to J. H. Culling is typical of such a device. The Culling disclosure teaches a semi-spherical object having light transmissive characteristics, concerning light rays passing into the interior of the sphere. The interior surface of the sphere is coated with a light reflective medium which permits light rays to partially pass therethrough. The target area is disposed substantially at the origin of the semi-sphere, in one embodiment of the Culling disclosure, such that light rays striking the semi-sphere in near horizontal directions and near vertical directions will reflect once from the interior surface and be directed at the target area. Additional lens or internal reflectors further widen the incidence angle of the sun, to the horizon, thereby increasing the efficiency of the device. The Culling device is limited, however, in a well defined target or heating area such that small targets only may be employed. This apparatus is useful in elevating the temperature of the target area to a great degree provided the target is small and is confined within the interior of the device.

U.S. Pat. No. 2,994,318 issued Aug. 1, 1961 to W. C. Lee discloses a reflector having the shape of a portion of a cylinder whose interior surface, having a concave shape, is juxtaposed to a tube, whose axis extends coaxially with the axis of the semi-cylinder. Light rays striking the interior surface of the semi-cylinder are concentrated on the tube causing a liquid or gaseous medium therein to be heated. It should be noted that each of the light rays eventually striking the tube approach the tube surface at diverse angles, never crossing one another or extending parallel to one another. Thus, the Lee teachings describe an apparatus which does not concentrate the rays of the sun in a reinforcement manner, but rather concentrate the rays of the sun passing through the interior of the open mouth portion of the semi-cylinder into an area equivalent to the cross section of the tube. If the diameter of the semi-cylinder were to be increased, whilst the diameter of the tube is maintained the same, a greater degree of axial alignment is required to insure that some of the collected rays would not be directed to a position not occupied by the tube. Furthermore, the Lee apparatus is functional only for those rays which strike the interior surface of the semi-cylinder within narrow angular limits relative to a line extending at right angles to the open mouth portion of the semi-cylinder.

SUMMARY OF THE INVENTION

A primary object of the present invention is to provide a low volume, highly efficient solar energy collector.

Another object of the present invention is to provide a solar energy collector which effectively heats a target area located outwardly from the collector body.

Still another object of the present invention is to provide a sensibly flat solar collector which efficiently operate on solar rays directed towards its lateral ray collecting surface with an angle of incidence thereto ranging some sixty degrees from the normal.

Yet another object of the present invention is to provide a solar collector which utilizes a concentrated target area, operating at relatively low temperatures which is suitable for building heating and hot water service.

A further object of the present invention is to provide the solar energy accumulator operating over a wide range of locations of the sun, relative to the lateral ray collecting surface.

Another object of the present invention is to provide an inexpensive solar collector which does not have the target area combined within the collector body, thereby avoiding complex construction and the need for frequent and expensive maintenance procedures.

Still another object of the present invention is to provide a solar collector, effective in heating water, whereby the water may be located within pipes disposed in a confined area, rather than dispersed over broad surfaces of the collector, limiting the possibility of leaks.

Yet another object of the present invention is to provide a solar collector whose energy level continually increases as the light rays or heat energy comprising it approximates the location of the target area, thereby minimizing heat losses otherwise experienced over the broad lateral surfaces of conventional solar energy accumulators.

Heretofore, solar energy accumulators utilized, in the main, a black body receiving purpose, thermally coupled to a plurality of water passageways. The black body was encased with a structure having a glass or plastic cover which accepted light rays therethrough but reflected the energy from the interior lateral surface thereof back toward the black body. The ability of the glass or transparent or semi-transparent plastic covering to maintain the heat within the structure housing the black body has been known for many years as the "greenhouse" effect. Coatings, of a wide variety, enhances the ability of the covering layer to retain the heat within the greenhouse-like housing. Water for other heat accumulating mediums, coursing through or adjacent to the black body were dispursed over broad areas so as to more efficiently accumulate the heat. This form of construction required installation at some angle to the surface of the terrain, approximating forty-five degrees and pointing in a direction generally southward so as to maximize the ability to accumulate the sun's rays, converting them into heat, by way of increasing the temperature of the liquid or other fluid medium coursing through the black body channels. In such construction, the undersurface of the black body required expensive installation because of the size of the undersurface. In order to gain access to the black body and the water passageways, the housing had to be disassembled or the entire panel, comprising the black body, housing, interconnecting pipes and light ray permeable-heat impermeable panel. Because the amount of water or other fluid medium being heated was always coursed through the passageways subjected to heating within the panel housing at slow rates, the amount, volume and weight of heating medium remain within the active portions of the panels was excessive.

Other solar collectors, well known in the art, utilized light focusing techniques which directed the light rays, received from various angles, directing same towards a small target area so as to concentrate the light intensity thereat. Such devices often required mechanical drives to direct the light focusing mechanism, often a parabolic reflector, towards the sun. When this technique was employed for solar heating purposes, the temperature of the target area was vastly increased over the required temperature of the heating medium, usually water. Thus, the water was elevated by extreme amounts resulting in large thermal losses.

The present invention resolves the problem of excessive heat loss encountered with small target areas and the temperature of extremely large areas, whose heat losses are borderline high because of the large radiating and conducting surfaces thereof on the other side of the surface absorbing heat, locating adjacent the "window" of the "greenhouse". The present invention utilizes an extremely simple technique, employing a wedge-shape body or housing, whose cross section is triangular, such that the smallest angle thereof is some two to ten degrees. The sun's rays, striking one of the lateral surfaces of the housing or body, enter same and are refracted within the body or housing downwardly towards the other lateral surface of the body or housing. Reflection now takes place, but this time at an increased angle, over the angle of incidence, due to the pitch difference of the lower surface. The light or heat rays, striking the undersurface of the light collecting surface, are first refracted as they enter the housing, utilizing the greenhouse effect, so as to direct light or heat rays downwardly towards the lowermost surface. Reflection takes place on the mirror surface. The process repeats such that each pair of reflections tend to dispose the light rays or heat energy in a more and more horizontal direction, towards the shortleg of the triangle, where the target area is located. The target area may be disposed outwardly from the body of the housing and is preferably fabricated from a hollow tubing through which the heating medium passes at relative speeds. The body may be solid, completely composed of glass, or if desired, may be hollow, having a liquid or gaseous medium therein, coupled with a selected angle for the apex angle of the wedge-shaped cross section, yielding a substantially planar housing capable of effectively heating conventional sized pipes, utilized as the target area. If desired, a black body may be disposed within the housing, a partial vacuum employed therein, and the interior surface of the housing, where convenient, may be covered with one of a variety of light transmissive-heat reflective substances. When the aforementioned embodiments may utilize a prismatic adapter, similar to a fresnel lens, however, having a plurality of straight prisims, disposed in side by side relationship, and located above the "window" surface of the body or housing. Should the prismatic adapter be utilized, light rays, extending normal to the surface of the terrain, may be started on their path, towards the horizontal, requiring a lesser number of internal refractions within the body or housing to which it is associated. By utilizing portions of the "window" surface of the collector, adapted with prismatic adapters thereover, and other portions of the "window" surface not having prismatic adapters associated therewith, the sun's rays, received in any angle of inclination of the sun, relative to the plane defining the "window" surface will effectively heat the small target area, generally disposed in a vertical plane, located at a point convenient to servicing and routine inspection. In this way, the target area will be heated for all positions of the sun without the need for tracking devices and disposing the heat accumulators, comprising the present invention, to the sun's rays, at preferred angles of use.

These objects as well as other objects of the present invention, will become more readily apparent after reading the following description of the accompanying drawings.

DESCRIPTION OF THE PREFERRED EMBODIMENT

Figure 1:
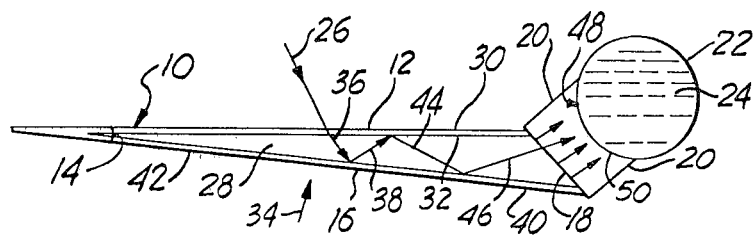
FIG. 1 is a cross sectional view of one embodiment of the present invention.

A clear understanding of the present invention may be had by referring to FIG. 1 showing a wedge-shaped solar collector 10 having a generally triangular cross section in which surface 12 is disposed at angle 14 relevant to surface 16. Surface 18 is fabricated from a transparent material, such as glass or a plastic material. Supports 20 locate boiler 22 outwardly from collector 10. Fluid medium 24 is disposed within boiler 22. The rays of the sun, depicted by line 26, enters the interior 28, of collector 10 by passing through, firstly, transparent sheet 30 and then through half mirror 32. Half mirror 32 permits the sun's rays to pass therethrough but does not reflected light, moving upwardly, generally in the direction of arrow 34 to pass outwardly therefrom. Thus, light rays, depicted by line 36, when reflected upwardly, along line 38, from mirrored surface 40, located on substrate 42, striking half mirror surface 32, is reflected downwardly along line 44. It should be noted that line 44 is slanted more toward the horizontal than is line 36, due to the relative pitch of surface 40 over surface 32. Light rays, depicted by arrow 46 leaves collector 10 and strikes surface 48 of boiler 22. It can be seen then, the greater angle 14, the less the internal reflections required for light rays, shown by numeral 26, to leave solar collector 10 and be directed at boiler 22. However, should angle 14 be large, the heating surface 50, of boiler 22, increases, thereby increasing the amount fluid medium contained within boiler 22. Boiler 22 may be any form of heat activated energy absorbing apparatus.

Figure 2:
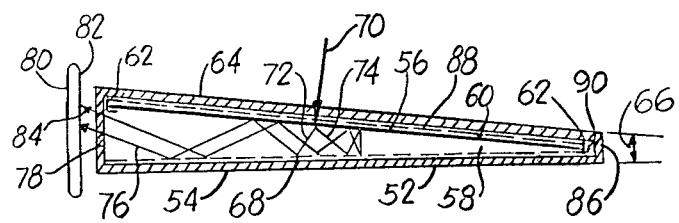
FIG. 2 is a cross sectional view of another embodiment of the present invention.

FIG. 2 illustrates a solar collector 52, utilizing a transparent casing 54, preferably fabricated from glass or a rigid transparent plastic material, such as one of the popular acetates. Body 56 is disposed within the interior 58 of solar collector 52, and is provided having a dull, light absorbing, upper surface 60. Insulating hooks 62 support black body 56 on lateral surface 64, of solar collector 52. Surfaces 54 and 64 are separated by angle 66. Dotted lines 68 depict a light transmissive, heat reflective coating, such as cadmium stannate. Such coating permits the light rays 70 to pass therethrough, being converted to heat on dull surface 60 and radiated in the direction of lines 72 and 74, in the form of heat rays. The lower side of body 56 is very smooth and so acts as a reflector. Heat rays 76, resulting from the heat rays coursing along in the direction of line 72, pass through transparent surface 78 so as to impinge on surface 82 of target 80. Heat rays 84 result from heat rays passing in the direction of line 74 and likewise strike surface 82. It should be noted that light, being normal to surface 54, reaches surface 82 by, in one case, passing to the apex end 86, of heat accumulator 52. Heat rays 72, located intermediate light rays 70 and target 80, proceed towards target 80 without approximating or moving in the direction of apex 86. Thus, the generally wedge-shaped body comprising accumulator 52, will operate effectively for light rays impinging on surface 64 at virtually any angle. The embodiment illustrated in FIG. 2 utilizes the greenhouse principle because of the light energy to heat energy converting property of black body 56. Interior 58 may be maintained at moderate negative pressures, thereby more successfully retaining the heat within accumulator 52. Dotted lines 88 and 90 illustrate location of additional light permeable-heat reflective surfaces tending to further maintain the heat content within accumulator 52, at all locations other than at surface 78.

Figure 3:
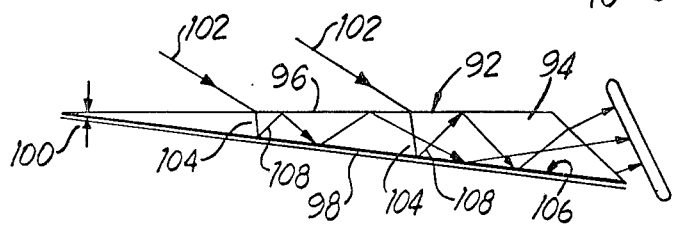
FIG. 3 is a cross sectional view of still another embodiment of the present invention.

FIG. 3 illustrates solar collector 92 being fabricated from a solid transparent body 94, shown in cross section. Lateral surface 96 is disposed angularly from lateral surface 98, being separated by angle 100. Light rays 102 enter body 94 and proceed at successively more horizontal directions due to two factors. The refractive index of body 92 bends light rays 102 along lines 104. Thence, mirrored surface 106, causes light rays to be directed along lines 108 towards the horizontal by twice angle 100. For example, if angle 100 is two degrees, each successive reflection, upwardly from surface 106, adds four degrees to the angle of incidence, such as experienced by light rays traveling along lines 104.

Figure 4:
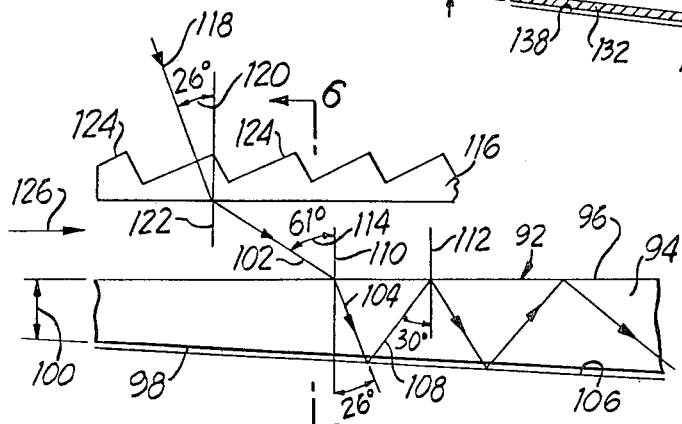
FIG. 4 is a enlarged view of the cross section shown in FIG. 3, having a portion of the prismatic adapter, shown in cross section.

FIG. 4 illustrates the parameters if body 94 were fabricated from glass, having a refractive index of two. Here, light rays 102, being at an angle no less than sixty-one degrees from line 110, normal to surface 96, enters material 94 along line 104 at an angle twenty-six degrees from line 110. Light rays traveling along line 108 form an angle of thirty degrees to line 112, wherein line 112 is also normal to surface 96. If light rays 102 were less than sixty-one degrees to line 110, light rays traveling along line 108 would emerge outwardly from surface 96. Thus, for a glass body 92, having a shape shown in FIG. 4, such that surfaces 98 and 96 are separated angularly two degrees light rays would be trapped within body 94 only if incidence light, striking surface 96, appears at an angle greater than sixty-one degrees to the normal line thereof. Mirrored surface 106 may be disposed of if light rays 104 strike surface 98, of body 94, at an angle greater than thirty degrees. Obviously, this increases angle 114, formerly sixty-one degrees, in the case in which mirrored surface 106 was required. A prismatic adapter 116, may be utilized, having light rays 118 entering at angle 120, shown at twenty-six degrees minimum, relative to normal line 122. Prismatic adapter 116 may consist of a solid glass-like body, superimposed or spaced apart from surface 96, with ridges 124 thereof extending along straight lines parallel and spaced apart from one another, alongst the entire length of surface 96, or a portion thereof, such that incident light may enter body 94, along lines 102 or 118. Thus, light rays extending along the direction of arrow 126, being normal to line 122, and ranging angularly upwardly towards line 118, being twenty-six degrees from line 122, may all enter body 94 provided a portion of surface 96 thereof is covered with prismatic adapter 116, and another portion of such surface 96, does not employ such an adapter.

Figure 5:
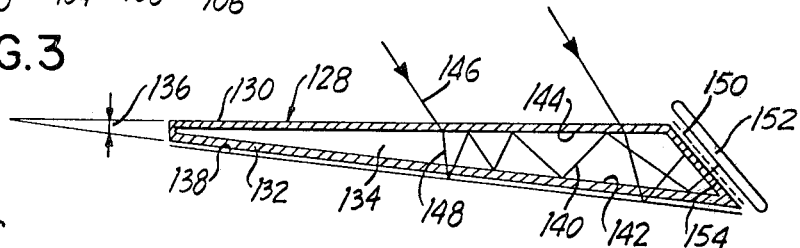
FIG. 5 is a cross sectional view of yet another embodiment of the present invention.

FIG. 5 is an alternate embodiment to the apparatus shown in FIG. 4, utilizing a hollow solar collector housing 128, having a window-like surface 130 and a lowermost surface 132, defining space 134 therein between, separated angularly, defined by angle 136. Mirrored surface 138 is shown located adjacent surface 132. Interior space 134 may be filled with a liquid or glass medium whose refractive index, coupled with the refractive index of surface 130, and the refractive index of surface 132, and angle 136, each contribute towards the interior reflections experienced by light rays 140 on interior surfaces 142 and 144 of surfaces 132 and 130 respectively. It should be noted that mirror surface 138 is not required if the angle of light ray 146 does not permit light ray 148 to pass through surface 132, as is shown for light ray 140. A heat reflective but light transmissive coating, is shown by dotted lines 150 disposed adjacent target 152 and side 154 of collector 128. The construction shown in FIG. 5 may be utilized for those size solar collectors in which solid plastic or solid glass collectors, shown in FIG. 3, become impractical because of size, cost, and weight considerations.

Figure 6:
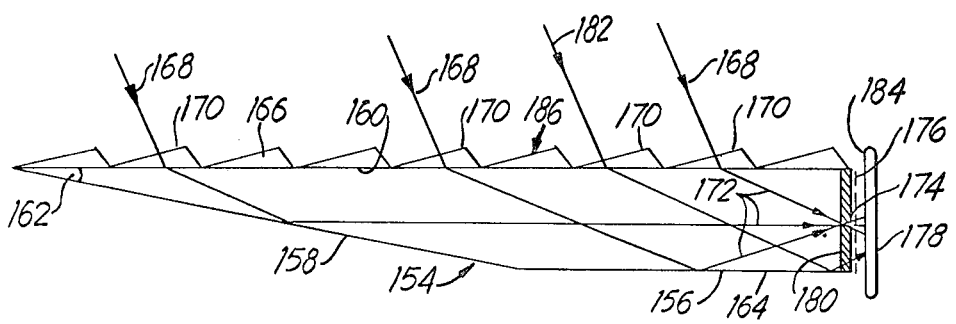
FIG. 6 is a cross sectional view of a varient embodiment of the present invention, utilizing a prismatic adapter.

FIG. 6 illustrates wedge-shaped body 154 being a part of rectangular cross section body 156, disposed adjacent thereto. Surface 158 and 160 are separated by angle 162, being equivalent to the generally wedge-shaped bodies shown in FIGS. 1–5. Any of the construction shown in FIGS. 1–5 may be utilized for the operation of wedge-shaped apparatus 154. Similarly, an identical construction may be utilized for rectangularly shaped construction 156, despite the fact that such rectangularly shaped construction has side 164 parallel to side 160. Though prismatic adapter 166 is shown mounted on surface 160, portions of surface 160 may be employed without a prismatic adapter. Light rays 168, each being parallel to one another, enter prismatic adapter 166, a fixed distance from apex ridges 170. Light rays 172 are shown to converge at point 174, shown immediately adjacent a light transmissive-heat reflective surface, shown by dotted line 176, separating boiler 178 from end 180 of rectangular body 156. Light ray 182, entering a different distance from ridge 170 than do light rays 168, impinges boiler 178, a distance away from point 174, thereby causing boiler 178 to have surface 184 thereof substantially entirely heated. It should be noted that the distribution of heat on surface 184 is contributed by all the light rays impinging on surface 186 of prismatic adapter 166. Thus, one point on surface 184 may receive light rays from several diverse locations on surface 186 of prismatic adapter 166, while adjacent location on surface 184 may also receive light rays from other diverse locations of prismatic adapter 166. In any event, the light buildup, adjacent end surface 180, is much greater in intensity, than the light rays passing through the leftmost portion of wedge-shaped body portion 158. Thus, heat losses, in the case of the greenhouse effect constructions, as shown in FIG. 2, will have a minimum amount of confined heat in the narrow wedge-shaped portion of the apparatus depicted in FIG. 6 than will the heat losses experienced by rectangular cross sectional portions 156. Similarly, the apparatus shown in FIG. 2 will experience a minimum amount of heat buildup, adajacent end wall 86, compared to end wall 78. Thus, the heat content of the apparatus shown in FIG. 2 increases and the thickness of body 52 increases, adjacent boiler 80. Where the cross sectional height is minimal, adjacent end 86, the heat content is less, thereby maximizing the efficiency of the apparatus because the ratio of heat content, in terms of trapped thermal energy, to volume of the interior of the apparatus, is constant. Thus, the ability to lose heat outwardly, by radiation or conduction remains constant but the ability to store thermal energy is increased as the volume within the housing, shown in FIG. 2, increases as the distance lessens to the boiler.

One of the advantages of the present invention is a low volume, highly efficient solar energy collector.

Another advantage of the present invention is a solar energy collector which effectively heats a target area located outwardly from the collector body.

Still another advantage of the present invention is a sensibly flat solar collector which efficiently operate on solar rays directed towards its lateral ray collecting surface with an angle of incidence thereto ranging some sixty degrees from the normal.

Yet another advantage of the present invention is a solar collector which utilizes a concentrated target area, operating at relatively low temperatures which is suitable for building heating and hot water service.

A further advantage of the present invention is the solar energy accumulator operating over a side range of locations of the sun, relative to the lateral ray collecting surface.

Another advantage of the present invention is an inexpensive solar collector which does not have the target area combined within the collector body, thereby avoiding complex construction and the need for frequent and expensive maintenance procedures.

Still another advantage of the present invention is a solar collector, effective in heating water, whereby the water may be located within pipes disposed in a confined area, rather than dispersed over broad surfaces of the collector, limiting the possibility of leaks.

Yet another advantage of the present invention is a solar collector whose energy level continually increases as the light rays or heat energy comprising it approximates the location of the target area, thereby minimizing heat losses otherwise experienced over the broad lateral surfaces of conventional solar energy accumulators.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A solar energy collector comprising a generally wedge-shaped body, said wedge-shaped body having a pair of adjacent lateral surfaces separated by a discrete angle, a heat activated energy absorbing apparatus, said energy absorbing apparatus being disposed outwardly of said body and opposite said discrete angle, means to receive light rays into said body passing through one of said pair of surfaces, means to convert said light rays into heat energy impinging on said energy absorbing apparatus, means to direct the heat energy contained within said light rays passing through said first surface towards said energy absorbing apparatus, wherein said means to direct comprises said body being a housing, said one of said pair of surfaces having an interior side thereof being coated with a light transmissive heat reflecting material, said housing having a cavity, said cavity containing a light absorbing heat generating surface of material therein, said heat generating surface being disposed parallel to the other of said pair of surfaces.

2. The apparatus as claimed in claim 1 wherein said light transmissive heat reflective coating comprises cadmium stannate.

3. The apparatus as claimed in claim 1 wherein said body comprises a transparent material.

4. The apparatus as claimed in claim 3 wherein said transparent material comprises glass.

5. The apparatus as claimed in claim 1 wherein said cavity is disposed at a negative pressure.

6. The apparatus as claimed in claim 1 further comprising a prismatic array, said prismatic array having a repetitive saw tooth cross section, said repetitive cross section being disposed parallel to one of said pair of surfaces.

7. The apparatus as claimed in claim 1 wherein said pair of surfaces define a portion of the walls of the housing, said walls being transparent, said housing containing a refractive medium therein.

8. The apparatus as claimed in claim 1 wherein said heat activated energy absorbing apparatus comprises a tube, said tube having a heating medium therein.

* * * * *